(12) United States Patent
Tang (10) Patent No.: US 10,972,187 B1
(45) Date of Patent: Apr. 6, 2021

(54) LIGHT SOURCE FOR QUANTUM COMMUNICATION SYSTEM, AND ENCODING DEVICE

(71) Applicant: QUANTUMCTEK CO., LTD., Hefei (CN)

(72) Inventor: Yanlin Tang, Hefei (CN)

(73) Assignee: QUANTUMCTEK CO., LTD., Hefei (CN)

( * ) Notice: Subject to any disclaimer, the term of this patent is extended or adjusted under 35 U.S.C. 154(b) by 154 days.

(21) Appl. No.: 16/472,854

(22) PCT Filed: Nov. 3, 2017

(86) PCT No.: PCT/CN2017/109242
§ 371 (c)(1),
(2) Date: Jun. 21, 2019

(87) PCT Pub. No.: WO2018/121053
PCT Pub. Date: Jul. 5, 2018

(30) Foreign Application Priority Data

Dec. 26, 2016 (CN) .......................... 201611217678.0

(51) Int. Cl.
*H04B 10/70* (2013.01)
*H04B 10/508* (2013.01)
*H04B 10/54* (2013.01)
*H04B 10/556* (2013.01)
*H04L 9/08* (2006.01)
*H04B 10/524* (2013.01)

(52) U.S. Cl.
CPC ....... *H04B 10/5561* (2013.01); *H04B 10/508* (2013.01); *H04B 10/524* (2013.01); *H04B 10/541* (2013.01); *H04B 10/70* (2013.01); *H04L 9/0858* (2013.01)

(58) Field of Classification Search
None
See application file for complete search history.

(56) References Cited

U.S. PATENT DOCUMENTS

| 6,674,969 B1 * | 1/2004 | Ogusu | H04B 10/25758 398/79 |
| 2004/0161109 A1 * | 8/2004 | Trifonov | H04L 9/0858 380/277 |
| 2006/0215714 A1 * | 9/2006 | Luo | H01S 3/13 372/29.02 |

(Continued)

FOREIGN PATENT DOCUMENTS

| CN | 102075239 A | 5/2011 |
| CN | 102163791 A | 8/2011 |

(Continued)

OTHER PUBLICATIONS

CN 201611217678.0, Official Action dated Jul. 18, 2018, 9 pages.

(Continued)

*Primary Examiner* — Li Liu
(74) *Attorney, Agent, or Firm* — Getech Law LLC; Jun Ye (57) ABSTRACT

Provided are a light source for use in the field of quantum communication, and an encoding device using the light source. When the light source is applied to Z basis encoding, a high and stable extinction ratio can be provided, and two consecutive optical pulses having a stable phase relation can be provided for encoding under an X basis.

8 Claims, 5 Drawing Sheets

(56) References Cited

U.S. PATENT DOCUMENTS

| | | | | |
|---|---|---|---|---|
| 2009/0059968 A1* | 3/2009 | Luo | ....................... | H01S 3/0606 372/18 |
| 2010/0046003 A1* | 2/2010 | Le Floch | ........... | G01B 9/02007 356/486 |
| 2011/0122912 A1 | 5/2011 | Benjamin et al. | | |
| 2012/0002972 A1* | 1/2012 | Stiffler | ............. | H04B 10/25759 398/115 |
| 2015/0304051 A1* | 10/2015 | Yuan | ...................... | H04B 10/70 398/188 |
| 2016/0047643 A1* | 2/2016 | Yuan | ...................... | H01S 5/4006 398/25 |
| 2016/0248515 A1 | 8/2016 | Zheng et al. | | |
| 2017/0237505 A1* | 8/2017 | Lucamarini | ........ | H04B 10/5161 398/185 |
| 2018/0006730 A1* | 1/2018 | Kuo | ...................... | H04B 10/616 |

FOREIGN PATENT DOCUMENTS

| | | | | |
|---|---|---|---|---|
| CN | 106209361 A | 12/2016 | | |
| CN | 106254065 A | 12/2016 | | |
| CN | 206775514 U | 12/2017 | | |
| FR | 3019691 B1 | 8/2017 | | |
| GB | 2525399 A | 10/2015 | | |
| GB | 2529228 A | * 2/2016 | ............. | H04B 10/70 |
| GB | 2529228 A | 2/2016 | | |
| JP | H04158331 A | 6/1992 | | |
| JP | 2004007674 A | 1/2004 | | |
| JP | 2014170169 A | 9/2014 | | |
| JP | 2016001868 A | 1/2016 | | |
| JP | 2016042694 A | 3/2016 | | |

OTHER PUBLICATIONS

EP 17886886.5, European Search Report dated Aug. 7, 2020, 9 pages.
JP 2019-555534, Official Action dated Sep. 7, 2020, 5 pages.
Tokura Yasuhiro; "Quantum Cryptography"; NTT Technical Journal, Telecommunications Association, vol. 23, No. 6, pp. 40-44, English Abstract, Jun. 2011, 6 pages.
"International Search Report," PCT/CN2017/109242, dated Jan. 29, 2018, English translation, 14 pages.

* cited by examiner

LIGHT SOURCE FOR QUANTUM COMMUNICATION SYSTEM, AND ENCODING DEVICE

This application is the national phase of International Patent Application No. PCT/CN2017/109242, titled "LIGHT SOURCE FOR QUANTUM COMMUNICATION SYSTEM, AND ENCODING DEVICE", filed on Nov. 3, 2017, which claims priority to Chinese Patent Application No. 201611217678.0, titled "LIGHT SOURCE FOR QUANTUM COMMUNICATION SYSTEM, AND ENCODING DEVICE", filed on Dec. 26, 2016 with the Chinese Patent Office, both of which are incorporated herein by reference in their entireties.

FIELD

The present disclosure relates to the technical field of quantum secure communication, and in particular to an encoding device and a light source for the encoding device.

BACKGROUND

The communication technology, which is essential in modern society, is developing rapidly. The quantum secure communication technology is an emerging technology in the field of communication technology and has a significant application prospect. The quantum secure communication technology relates to an interdisciplinary field of quantum mechanics, modern communication and modern cryptography, and has an incomparable advantage in safety compared with conventional communication technology. Among various subfields of the quantum secure communication technology, the quantum key distribution (QKD) technology is widely used and is fit for commercialization. The QKD technology is founded based on the principle of quantum mechanics. It provides information-theoretically secure key for information encryption in a "one time pad" manner, such that indecipherability in secure communication is ensured in principle, leading to a significant progress in the fields demanding high level of confidentiality, such as defense agencies, financial institutions, government departments and internet financial business.

The BB84 protocol, as the first quantum key distribution protocol proposed in 1984 has been widely used. It involves the most mature technology and has the best comprehensive advantage. The BB84 protocol uses the four-state encoding method. In the four-state encoding method, information is encoded in a polarization encoding manner or a phase encoding manner, then transmitted, and at last decoded by a simple decoding device including a wave plate, a beam splitter, a phototube, a circuit and the like. The BB84 protocol requires a simple structure and system technology, which is easy to maintain and produce in mass. Therefore, the BB84 protocol has an incompatible advantage in key rate and distance compared with other protocols.

However, with the development of the QKD system and the improvement of the QKD theories, the practical security will be undermined and be deviated from information-theoretical security, since there are certain cases that do not conform to theoretical assumptions in practice. The exposed loophole of the practical QKD system has thus become an attacking target of quantum hackers. The well-known photon number splitting attack intercepts and attacks the multi-photon component in a non-ideal single photon source, to perform eavesdropping. A way to avoid this photon number splitting attack is to adjust intensity of light at a transmitting end based on the decoy-state theory, that is, employing a decoy-state BB84 quantum key distribution system.

In a decoy-state BB84 quantum key distribution system, the encoding scheme such as polarization encoding, phase encoding and time-bin-phase encoding are mainly used. The polarization encoding has advantages of a low cost and a simple structure, and has disadvantages of susceptibility to fiber polarization disturbance, which directly affects a bit error rate. The compensation for polarization thus required may result in a time waste and thus a reduced or unstable key rate.

Compared with the polarization encoding, the phase encoding scheme adopts light pulses generated by an unbalanced interferometer, and encodes the information on a phase difference between two adjacent light pulses, which is less affected by polarization disturbance of an optical fiber. Therefore, the polarization disturbance will not result in an increase in the bit error rate, and the phase encoding is favorable for application in long-distance transmission or strong external disturbance circumstance. The phase encoding has a disadvantage that a receiver of a conventional phase system has a large insertion loss, thus both the key rate and the largest distance are lower than that of the polarization system.

The time-bin-phase encoding scheme is developed based on the above situation. It is performed under two bases, that is, a time basis (that is, a Z basis with an eigenstate of $$|t_0\rangle, |t_1\rangle),$$

and a phase basis (that is, a X basis with an eigenstate of $$\frac{1}{\sqrt{2}}(|t_0\rangle + |t_1\rangle), \frac{1}{\sqrt{2}}(|t_0\rangle - |t_1\rangle)$$

or a Y basis with an eigenstate of $$\frac{1}{\sqrt{2}}(|t_0\rangle + i|t_1\rangle), \frac{1}{\sqrt{2}}(|t_0\rangle - i|t_1\rangle)).$$

Figure 1:
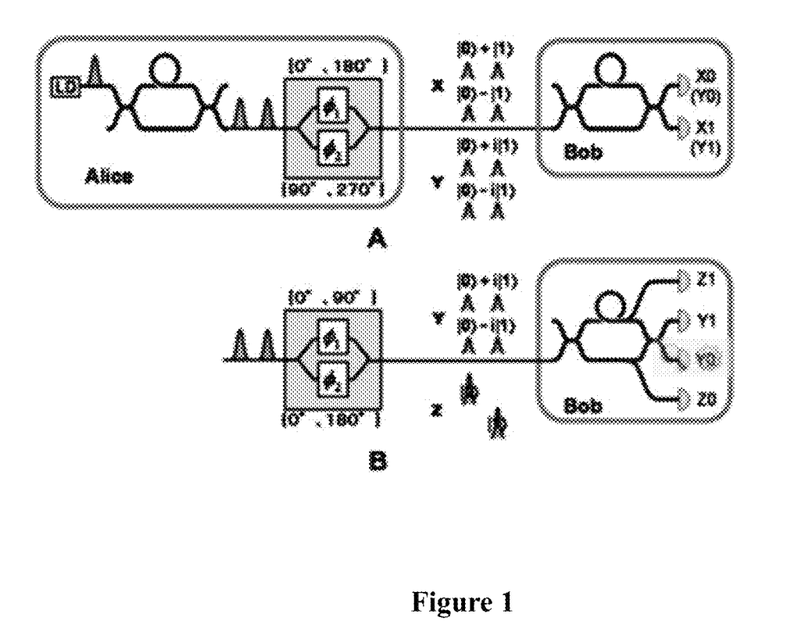
FIG. 1 schematically shows an encoding device for time-bin phase encoding according to the conventional technology.

FIG. 1 shows an encoding device for time-bin phase encoding. As shown in FIG. 1, a laser pulse from a light source is inputted to an unbalanced Mach-Zehnder (MZ) interferometer, to form two pulse components temporally separated from each other. The two pulse components are inputted to a balanced interferometer one after another. The balanced interferometer includes two Phase Modulators (PM), and different interference light intensities and phases could be generated by adjusting a relative phase difference between the two PMs. For pulse components arriving at different times, different light intensities and phases may be obtained by modulating the voltage on PM. The encoding device shown in FIG. 1 could perform encoding on three bases. For example, phase differences 0 and π of the balanced interferometer respectively correspond to an extinction result and an opposite lighting result in the case of Z basis encoding. Phase differences π/2 and −π/2 of the balanced interferometer both correspond to a case of outputting pulses, and the phase difference between the pulses determines whether the X basis encoding or the Y basis encoding is performed.

Figure 2:
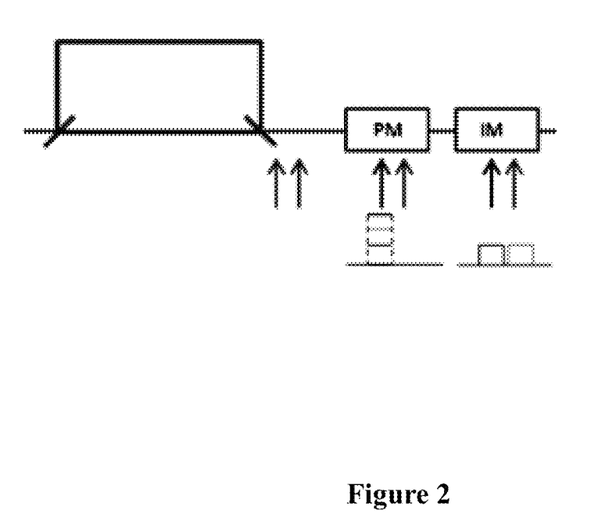
FIG. 2 schematically shows another encoding device for time-bin phase encoding according to the conventional technology.

FIG. 2 shows an encoding device for time-bin phase encoding. As shown in FIG. 2, a laser pulse from a light source is inputted to an unbalanced Mach-Zehnder (MZ) interferometer, to form two pulse components temporally separated from each other. In order to perform the phase encoding for X basis and the Y basis, four phases 0, $\pi$, $\pi/2$ and $3\pi/2$ are applied between the two pulse components by the phase modulator. In order to perform the time-bin coding for Z basis, the two successive pulse components are modulated by an Intensity Modulator (IM). By controlling one of the successive pulse components to generate the extinction result, and the other one to generate an opposite lighting result, only the former or the latter component is maintained, in this way, a time-bin state $|t_0\rangle$ or $|t_1\rangle$ could be obtained. For the X basis encoding or the Y basis encoding, the two pulse components are both passed through the intensity modulator with a half intensity left. Since the intensity modulator may function as a balanced interferometer, the encoding device shown in FIG. 1 is consistent with the encoding device shown in FIG. 2 in encoding principle.

It can be seen from the above that, in the known encoding devices for time-bin phase encoding, elements based on the principle of the balanced interferometer are needed in the encoding process. The stability of the time basis and phase basis, the key rate and the stability of the key rate all depend on the stability of the balanced interferometer elements. However, a phase of an balanced interferometer formed by an optical fiber may be changed under different ambient temperatures, stress, vibrations or the like, unable to ensure stability of an interference result, thus resulting in problems such as instability of the Z basis and the X basis and a poor extinction ratio. Therefore, the known encoding device for time-bin phase encoding has defects in basis stability, key rate and the stability of the key rate, especially in a poor encoding condition in which frequent intensity feedback is required for stabilizing the time-bin encoding, or phase feedback is required for stabilizing the phase encoding. In this case, other feedback devices and structures are required, resulting in an increased cost of the system and poor information transmission efficiency, thus the usage range is limited.

The conventional encoding device for performing both time-bin encoding and phase encoding has deficiency of unstable encoding and poor extinction ratio, which directly results in a low communication transmission efficiency and a limited transmission distance. In addition, there is not a good solution to the problems according to the existing literatures. Even the structure is simplified or the encoding scheme is improved, and the whole communication system is optimized, this may just improve the communication effect to a certain extent, rather than solving these problems.

For example, Toshiba Corporation has proposed a solution in which the pulse light source is realized using a pulse injection locking technique in the quantum communication system. With the light source solution based on the pulse injection locking technique, spectrum performance of the light pulse is better, and the interference performance of the encoding state is improved, such that the encoding performance is improved. However, in the solution proposed by Toshiba Corporation, the polarization encoding is performed, which may be affected by change in polarization of a fiber during transmission, and the polarization feedback is required for compensating polarization deviation. In addition, in the solution based on the injection locking technique, the light source still outputs a light pulse with a random phase, and the final interference effect is enhanced just by improving the spectrum performance of the light pulse and reducing the time jitter of the light pulse. With this light source solution, only the interference effect of the light pulse is improved to a certain extent, while the above defects in the encoding device for time-bin phase encoding still not be solved, resulting in an insufficient improvement in the performance of the whole communication system.

SUMMARY

In view of the above defects in the conventional technology, a light source for performing both time-bin encoding and phase encoding, and an encoding device using the light source are provided in the present disclosure, to allow time-bin phase encoding with a high stability and a high extinction ratio.

In the present disclosure, the light source includes a master laser and a slave laser. The master laser is configured to output, in response to a master drive signal from a master drive signal source, a master laser pulse during a system period, to form a seed light. The slave laser is configured to output, under stimulation of the seed light and in response to a slave drive signal from a slave drive signal source, a slave laser pulse in an injection locking manner, to encode a signal light pulse.

In the present disclosure, the slave drive signal may include a first slave drive signal, a second slave drive signal and a third slave drive signal. One of the first slave drive signal, the second slave drive signal and the third slave drive signal is randomly selected and outputted during a system period, to drive the slave laser. During the system period, the slave laser may be configured to output only one first slave laser pulse in response to the first slave drive signal, where the first slave laser pulse is generated under stimulation of a pulse component of the master laser pulse at a first time position. During the system period, the slave laser may be configured to output only one second slave laser pulse in response to the second slave drive signal, where the second slave laser pulse is generated under stimulation of a pulse component of the master laser pulse at a second time position. During the system period, the slave laser may be configured to output two successive third slave laser pulses in response to the third slave drive signal, where the two third slave laser pulses are generated respectively under stimulation of a pulse component of the master laser pulse at a third time position and a pulse component of the master laser pulse at a fourth time position. Therefore, in a case that the light source in the present disclosure is applied in the Z basis encoding, a high and stable extinction ratio can be achieved, and two successive laser pulses with a stable phase relation are generated for the X basis encoding.

Further, the master laser is connected to the slave laser via an optical transmission element. The master laser pulse is inputted to a first port of the optical transmission element and is outputted from a second port of the optical transmission element, and is injected into the slave laser after being outputted from the second port of the optical transmission element. The slave laser pulse is inputted to the second port of the optical transmission element and is outputted from a third port of the optical transmission element.

In an exemplary aspect of the present disclosure, the number of the master laser is one, and an operating frequency of the master laser is equal to a system frequency. The number of the slave laser is one, and an operating frequency of the slave laser may be at least twice the operating frequency of the master laser. A width of the master laser pulse may be greater than or equal to a total width of the two successive third slave laser pulses.

Further, a relative time delay between the master laser and the slave laser is set to allow the master laser pulse injected to the slave laser to cover two successive third slave laser pulses in time during the system period.

Further, the light resource may further include a laser configured to provide another seed light for the master laser, to allow the master laser to generate the master laser pulse in the injection locking manner.

In another exemplary aspect of the present disclosure, the number of each of the master laser and the slave laser is one. An unbalanced interferometer is arranged between the master laser and the optical transmission element. An arm length difference of the unbalanced interferometer is set to allow a time difference between two successive pulse components formed through splitting the master laser pulse by the unbalanced interferometer is equal to a time interval between the two third slave laser pulses.

Further, an operating frequency of the master laser is equal to a system frequency. An operating frequency of the slave laser is at least twice the operating frequency of the master laser. A width of the master laser pulse is greater than a width of the slave laser pulse.

Further, a relative time delay between the master laser and the slave laser is set to allow the two pulse components formed through splitting the master laser pulse by the unbalanced interferometer, when being injected into the slave laser, to respectively cover the two successive third slave laser pulses in time during the system period.

In another exemplary aspect of the present disclosure, the number of the master laser is one. The number of the slave laser is two, and the number of the optical transmission element connected to the slave laser is two. The master laser is connected to a first beam splitter, which is connected to the two slave lasers respectively via the two optical transmission elements. The two slave lasers are connected to a second beam splitter respectively via the two optical transmission elements, to combine the two slave laser pulses outputted from the two slave lasers, and then the combined two slave laser pulses are outputted. The first beam splitter is configured to split the master laser pulse into the two pulse components.

Further, an operating frequency of the master laser and an operating frequency of the slave laser are equal to a system frequency. The width of the master laser pulse is greater than the width of the slave laser pulse.

Further, a relative time delay between the master laser and the slave laser is set to allow the two pulse components formed through splitting the master laser pulse by the first beam splitter to respectively cover one of two third slave laser pulses at different time positions during the system period when being injected into the slave laser.

Further, a tunable time delay element may be further arranged between the optical transmission element and the second beam splitter.

Preferably, the optical transmission element is a circulator or a beam splitter.

Preferably, the first time position may be identical to the third time position and the second time position may be identical to the fourth time position.

Preferably, an intensity of the first slave laser pulse is equal to an intensity of the second slave laser pulse, and the intensity of the first slave laser pulse is twice an intensity of the third slave laser pulse.

In another aspect of the present disclosure, an encoding device for performing both time-bin encoding and phase encoding is further provided. The encoding device may include the light source described above.

Optionally, the encoding device may further include at least one of a phase modulator and an intensity modulator. The phase modulator is configured to modulate a phase difference between the two successive third slave laser pulses. The intensity modulator is configured to modulate a relative intensity among the first slave laser pulse, the second slave laser pulse and the third slave laser pulse.

The light source provided in the present disclosure has a novel structure suitable for an application in which both time-bin encoding and phase encoding are performed which is formed based on the injection locking technique and the laser internal modulation technique. On one hand, the pulsed light resource may provide a time-bin state (the Z basis) with a high and stable extinction ratio with the laser internal modulation technique. On the other hand, the pulsed light resource may provide two pulses with a fixed time relation and a fixed phase relation rather than providing a random pulse with the laser internal modulation technology, for the phase encoding (the X basis). In this way, a preconception that the laser internal modulation technique is not directly used for phase encoding (the X basis) due to that only pulses with a random phase relation are generated with the laser internal modulation technique is eliminated.

DETAILED DESCRIPTION OF EMBODIMENTS

Hereinafter, exemplary embodiments of the present disclosure are described in detail with reference to the drawings. The following embodiments of the present disclosure are described by way of examples, to fully convey the spirit of the present disclosure to those skilled in the art. Therefore, the present disclosure is not limited to those embodiments described hereinafter.

According to the present disclosure, the light source may include a master laser and a slave laser. The master laser is configured to output a master laser pulse in response to a master drive signal from a master drive signal source, to form a seed light. The slave laser is configured to output a slave laser pulse in response to a slave drive signal from a slave drive signal source, to perform encoding. The slave drive signal may include a first slave drive signal, a second slave drive signal and a third slave drive signal, and the slave drive signal source may randomly output one of the first slave drive signal, the second slave drive signal and the third slave drive signal. During the system period, the slave laser outputs only one first slave laser pulse in response to the first slave drive signal, and the first slave laser pulse is generated under stimulation of a pulse component of the master laser pulse at a first time position. During the system period, the slave laser outputs only one second slave laser pulse in response to the second slave drive signal, and the second slave laser pulse is generated under stimulation of a pulse component of the master laser pulse at a second time position. During the system period, the slave laser outputs two successive third slave laser pulses in response to the third slave drive signal, and the two successive third slave laser pulses are generated respectively under stimulation of a pulse component of the master laser pulse at a third time position and a pulse component of the master laser pulse at a fourth time position. Since the two seed lights used to stimulate the slave laser to output the two third slave laser pulses are originated from two pulse components of the master laser pulse, there is a fixed phase relation between the two seed lights. Therefore, in an injection-locking light-emitting mechanism, there is also a fixed phase relation, rather than a random phase relation, between the two successive third slave laser pulses generated under the stimulation of the two seed lights which are originated from the two pulse components of the master laser pulse.

Herein, time positions such as the first time position, the second time position, the third time position and the fourth time position may be used to indicate relative time positions during a system period.

The light source in the present disclosure is suitable for time-bin phase encoding. The first slave laser pulse and the second slave laser pulse may be used for Z basis encoding, that is, time-bin encoding. The two successive third slave laser pulses may be used for X basis encoding, that is, phase encoding. In other words, in a case of the Z basis encoding, the slave drive signal source may output one of the first slave laser pulse and the second slave laser pulse, to allow the slave laser to output a slave laser pulse with a fixed time feature (for example, temporally preceding or temporally successive) under stimulation of a master laser pulse, to perform time-bin encoding. In a case of the X basis encoding, the slave drive signal source may output the third slave drive signal, to allow the slave laser to output two successive third slave laser pulses between with a fixed time relation and a fixed phase relation under stimulation of the master laser pulse, to perform phase encoding.

Preferably, the first slave laser pulse and the second slave laser pulse may be set to have the same intensity, and each of the two successive third slave laser pulses may be set to have an intensity of a half of the intensity of the first slave laser pulse or the second slave laser pulse. The first time position may be identical to the third time position and the second time position may be identical to the fourth time position.

Those skilled in the art should understand that the drive signals are not limited to the first slave drive signal, the second slave drive signal and the third slave drive signal, and there may be other slave drive signals. Therefore, under the stimulation of a master laser pulse, the slave laser may not be limited to just outputting the first slave laser pulse, the second slave laser pulse and the third slave laser pulse. Instead, the slave laser may output one slave laser pulse at another time position, or output more successive slave laser pulses with a fixed time relation and a fixed phase relation.

In order to understand the principle of the present disclosure, the application in the time-bin phase encoding scheme is taken as an example. FIGS. 3 to 6 show several embodiments of the light source in the present disclosure. In the embodiments, for illustrative purposes, a case that the drive signal source outputs the first slave drive signal, the second slave drive signal and the third slave drive signal, and the first time position is identical to the third time position and the second time position is identical to the fourth time position is described as an example. However, those skilled in the art should understand that those embodiments are only exemplary, and not intended to limit the present disclosure.

First Embodiment

Figure 3A:
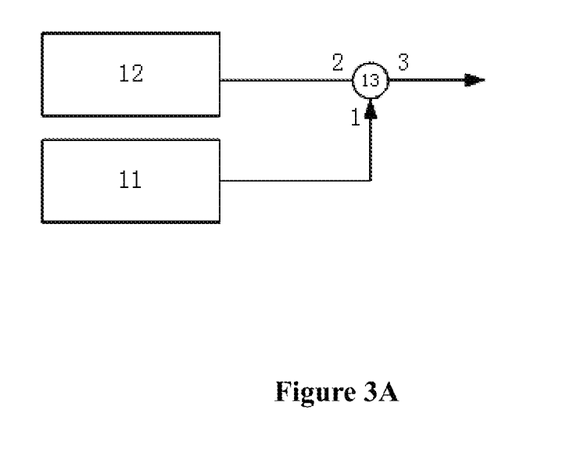
FIG. 3A schematically shows a light source and an encoding device according to a first embodiment of the present disclosure.

FIG. 3A shows a light source according to a first embodiment of the present disclosure. As shown in FIG. 3A, in the first embodiment of the present disclosure, the light source includes a master laser 11 and a slave laser 12. The master laser 11 is connected to the slave laser 12 via an optical transmission element 13. The optical transmission element 13 may include three ports, that is, a port 1 to a port3. Light inputted to the port 1 may be outputted from the port 2, and light inputted to the port 2 may be outputted from the port 3. In this embodiment, the master laser 11 is connected to the port 1 of the optical transmission element 13. The slave laser 12 is connected to the port 2 of the optical transmission element 13. The port 3 of the optical transmission element 13 severs as an output port of the light source.

The optical transmission element may be a circulator or a beam splitter. Preferably, in this embodiment, the circulator is used as the optical transmission element.

An operating frequency of the master laser 11 may be equal to the system frequency. An operating frequency of the slave laser 12 may be at least twice the operating frequency of the master laser 11. A total width (that is, a sum of pulse widths and a time interval) of two successive slave laser pulses is less than a width of a master laser pulse, such that the two slave laser pulses are generated under stimulation of the master laser pulse, as shown in FIG. 3B.

Figure 3B:
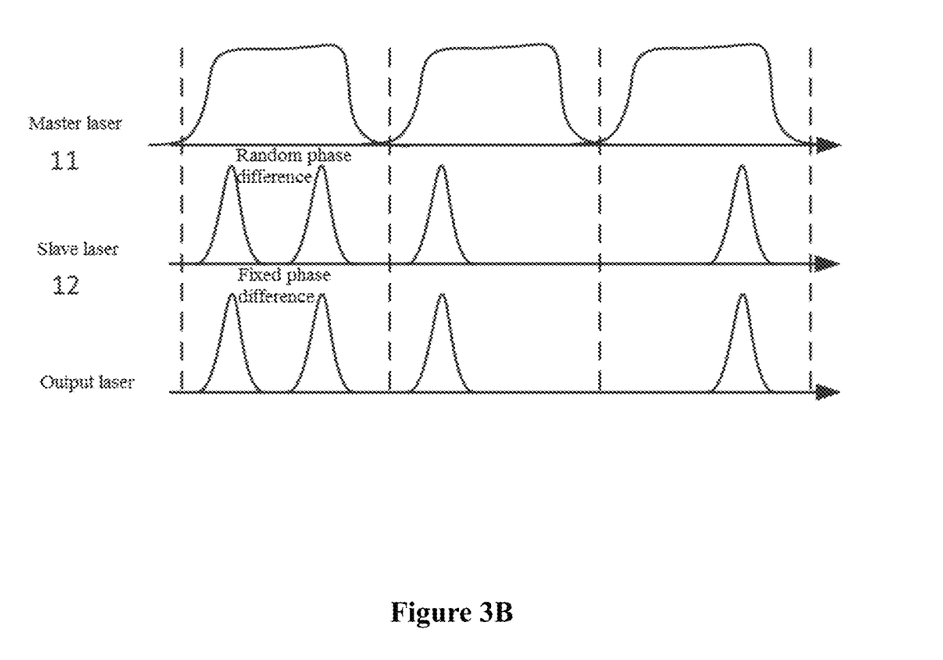
FIG. 3B schematically shows a forming process of light pulses in the light source according to the first embodiment of the present disclosure.

As shown in FIGS. 3A and 3B, the master laser 11 outputs the master laser pulse. The master laser pulse is directly injected into the slave laser 12 via the port 2 of the circulator 13 as a seed light. By adjusting a relative time delay between the master laser and the slave laser, to allow the master laser pulse injected into the slave laser to cover two successive slave laser pulses in time during a system period, the slave laser 12 generates two successive slave laser pulses in an injection locking manner under the stimulation of the master laser pulse as the seed light. The slave laser pulse is outputted from the port 3 of the circulator 13, and serves as an output pulse of the light source.

With the light source in the present disclosure, in a case of X basis encoding, during a system period, a slave drive signal source outputs a third slave drive signal, to allow the slave laser to generate, under stimulation of the master laser pulse injected to the slave laser, two slave laser pulses at the third (or the first) time position and the fourth (or the second) time position in the injection locking manner. The two seed lights used to stimulate the slave laser to generate the two third slave laser pulses are originated from two pulse components at the third time position and the fourth time position of the master laser pulse injected into the slave laser. Output times of the two third slave laser pulses correspond to the third time position and the fourth time position respectively. A difference between the output times of the two third slave laser pulses is equal to a time difference between the third time position and the fourth time position. In the injection locking manner, there is a fixed phase relation between the slave laser pulse and a corresponding seed light, and there is a fixed phase relation (a phase difference) between the two pulse components of a master laser pulse at the third time position and the fourth time position. Therefore, there is a fixed phase difference between the two successive third slave laser pulses outputted during a system period, rather than a ransom phase relation in a non-injection-locking manner nor a random phase relation under stimulation of different master laser pulses in the injection locking manner. The phase difference may be determined based on the third time position and the fourth time position.

In this case, there is a fixed phase relation between the two outputted third slave laser pulses, the two outputted third slave laser pulses may be directly inputted to a phase modulator 14 when necessary, to apply a modulation phase of 0 or $\pi$ between the two outputted third slave laser pulses, to perform the X basis encoding. Compared with the conventional technology, at least a beam splitting element for generating two light pulses with a fixed time relation and a fixed phase relation, for example, an unbalanced interferometer or a beam splitting element formed by a beam splitter and a delay line, is omitted in an encoding light path, thereby simplifying the light path structure of the encoding device. In addition, it is unnecessary to split a signal light in the encoding light path, thereby reducing a demand for laser power, thus reducing a system requirement and a cost. Further, due to the stability of the X basis, especially for a measurement-device-independent quantum key distribution (MDIQKD) protocol, a real-time phase calibration feedback device necessary for a conventional phase encoding and/or time-bin phase encoding system and an additional light path for a feedback light may be omitted. In addition, it is only required to transmit a measured error rate of the X basis from a measurer Charlie of MDIQKD to transmitters Alice and Bob of the MDIQKD via the classical channel, and Alice and Bob modulate respective initial phases, to obtain an initial phase difference, without phase feedback subsequently.

In a case of the Z basis encoding, during a system period, the drive signal source randomly outputs one of the first drive signal and the second drive signal, such that the slave laser generates, under the stimulation of the master laser pulse injected into the slave laser, a first slave laser pulse at the first time position or a second slave laser pulse at the second time position in the injection locking manner. Similarly, the seed light used to stimulate the slave laser to generate the first slave laser pulse or the second slave laser pulse is originated from a pulse component at the first time position or the second time position of the master laser pulse injected into the slave laser. An output time of the first slave laser pulse and the second slave laser pulse respectively corresponds to the first time position and the second time position. The first slave laser pulse and the second slave laser pulse with respective output time features may be directly used to represent different time-bin codes. For example, in a case that the light source outputs only the first slave laser pulse during a system period, the first slave laser pulse may be used to represent a case that lighting occurs at the first time position and extinction occurs at the second time position, that is, to represent a time-bin code 1. In a case that the light source outputs only the second slave laser pulse during a system period, the second slave laser pulse may be used to represent a case that extinction occurs at the first time position and lighting occurs at the second time position, that is, to represent a time-bin code 0; and vice versa.

It is to be noted that, a contrast of the Z basis generated in this case is determined by an extinction degree where the laser does not output a light pulse, thus the extinction degree may be high and stable and is not affected by the environment. However, in the conventional time-bin-phase encoding scheme, the extinction is realized based on the interference principle (the intensity modulator is equivalent to the unbalanced interferometer in principle). However, the interference phase may be affected by external environment, thus a low and unstable extinction ratio may be caused. In the Z basis encoding, at least an element used for providing extinction under the Z basis is omitted in the encoding light path, which simplifies the light path structure of the encoding device, and provide a high and stable extinction ratio. In this way, an intensity feedback device for ensuring the stable extinction under the Z basis is omitted, such that a key rate and stability of the key rate are significantly improved.

Further, in the present disclosure, an amplitude of the slave drive signal may be set such that the first slave laser pulse and the second slave laser pulse for the Z basis have the same intensity, and the intensity of the third slave laser pulse for the X basis is a half of the intensity of the first slave laser pulse or the second slave laser pulse. In this case, the intensity of the pulse for the Z basis is equal to the intensity of the pulse for the X basis, such that an intensity modulator IM for intensity normalization is omitted in the encoding light path, thereby simplifying the light path structure of the encoding device, and improving the stability of the encoding device.

Alternatively, the first slave laser pulse, the second slave laser pulse and the third slave laser pulse may be set to have the same intensity. In this case, the intensity of the pulse for the Z basis is different from the intensity of the pulse for the X basis. Since it is required to output two slave laser pulses for the X basis, and output only one slave laser pulse for the Z basis, the intensity of the pulse for the X basis is twice the intensity of the pulse for the Z basis. Therefore, an intensity modulator 15 is required in the encoding light path, to attenuate the intensity of the pulse for the X basis to be a half, to allow the intensities of pulses for different bases are equal to each other. The intensity modulator's state may vary, however, the extinction ratio under the Z basis is not affected, and stability of the encoding device under the Z basis is not affected.

Second Embodiment

Figure 4A:
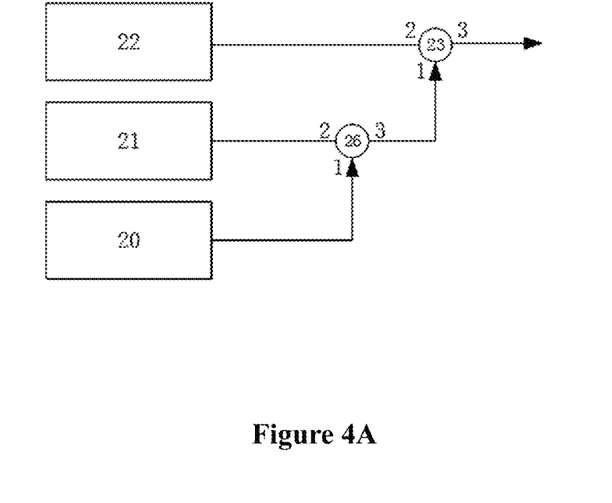
FIG. 4A schematically shows a light source and an encoding device according to a second embodiment of the present disclosure.
Figure 4B:
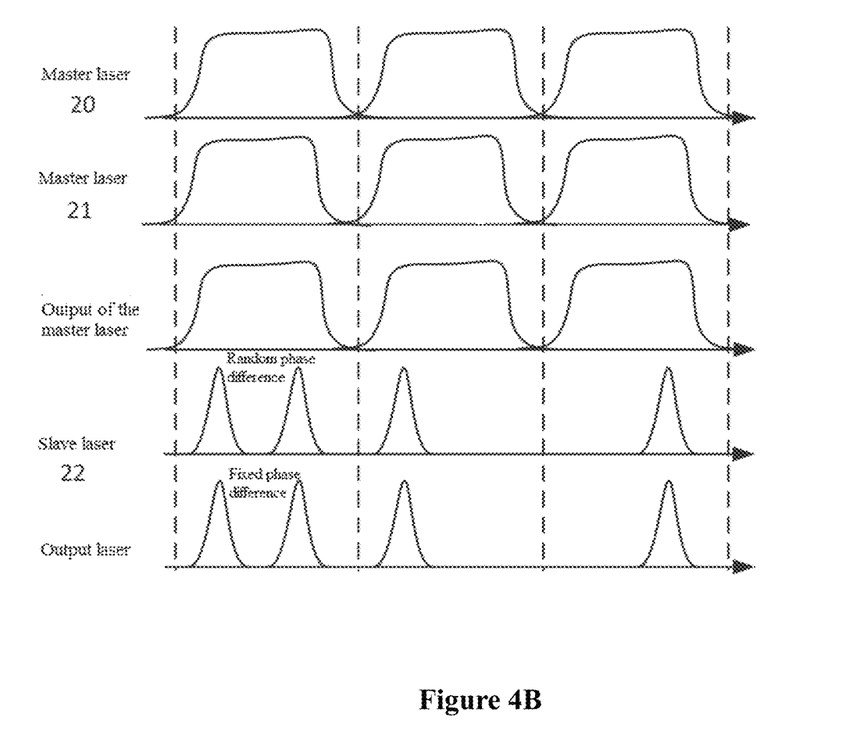
FIG. 4B schematically shows a forming process of light pulses in the light source according to the second embodiment of the present disclosure.

FIG. 4A shows a light source according to a second embodiment of the present disclosure, which is improved in structure based on the light source shown in FIG. 3A. Compared with the light source shown in FIG. 3A, a master laser 20 is further provided in the light source shown in FIG. 4A. The first master laser 20 is connected to the second master laser 21 via an optical transmission element 26. The second master laser 21 outputs a pulse in the injection locking manner under stimulation of the seed light from the first master laser 20, to provide a seed light for a slave laser 22. The second master laser 21 is connected to the slave laser 22 via an optical transmission element 23. As shown in FIG. 4B, the slave laser 22 outputs a pulse in the injection locking manner under stimulation of the seed light from the second master laser 21, to provide a signal light pulse for encoding.

In this embodiment, structures and configurations of the optical transmission elements 23 and 26, as well as connection between the first master laser 20 and the second master laser 21 and connection between the second master laser 21 and the slave laser 22 are the same as those described in the description relating to the optical transmission element 13 in the first embodiment, and the manner in which the slave laser 22 generates a pulse under an action of the master laser, as well as processes and structures of subsequent time-bin encoding and phase encoding are the same as those described in the related description in the first embodiment. Thus, description is not repeated, and only differences between the second embodiment from the first embodiment are described in detail herein.

Different from the first embodiment, in the second embodiment, the second master laser 21 outputs a laser pulse in the injection locking manner under the stimulation of the seed light from the first master laser 20. Therefore, the spectrum performance of the seed light from the second master laser 21 for the slave laser 22 is improved. Specifically, compared with the first embodiment, in this embodiment, there is a good consistency between the two successive third slave laser pulses outputted from the light source during a system period, such that an interference contrast for the X basis decoding is improved, and the bit error rate for the X basis decoding is reduced.

Third Embodiment

Figure 5A:
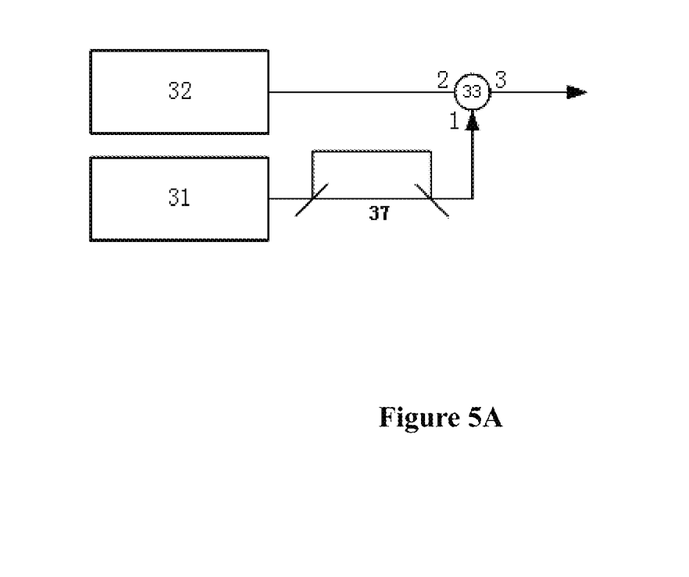
FIG. 5A schematically shows a light source and an encoding device according to a third embodiment of the present disclosure.

FIG. 5A shows a light source according to a third embodiment of the present disclosure. In this embodiment, the light source includes a master laser 31 and a slave laser 32. The master laser 31 is connected to an optical transmission element 33 via an unbalanced interferometer 37, and is connected to the slave laser 32 via the optical transmission element 33. The optical transmission element 33 may also include three ports, that is a port 1 to a port 3. Light inputted to the port 1 may be outputted from the port 2, and light inputted to the port 2 may be outputted from the port 3. In this embodiment, the master laser 31 is connected to the port 1 of the optical transmission element 33 via the unbalanced interferometer 37. The slave laser 32 is connected to the port 2 of the optical transmission element 33, and the port 3 of the optical transmission element 33 serves as an output port of the light source.

The optical transmission element may be a circulator or a beam splitter. Preferably, in this embodiment, a circulator is used as the optical transmission element. The unbalanced interferometer 37 may be, for example, an unbalanced Mach-Zehnder (MZ) interferometer or an unbalanced Michelson interferometer. Preferably, in this embodiment, the MZ interferometer is taken as an example.

Figure 5B:
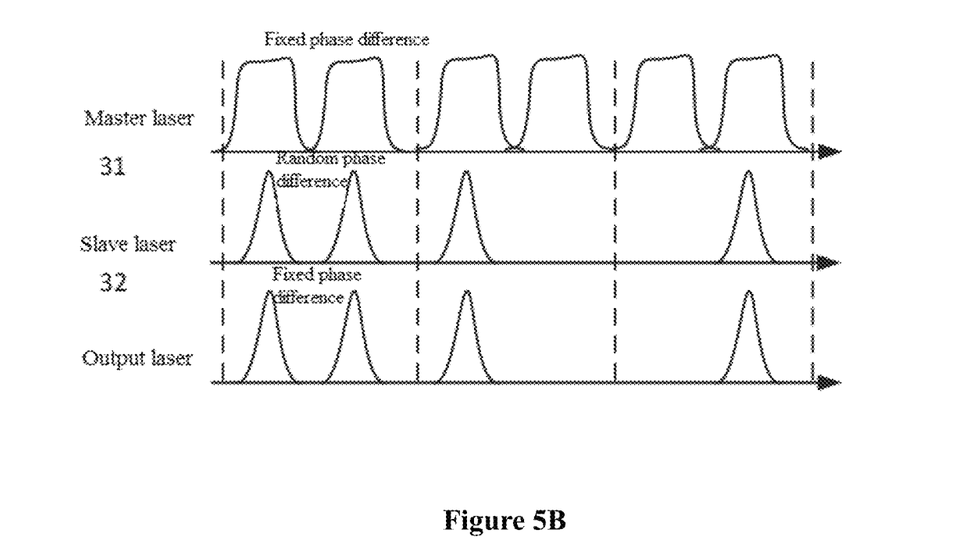
FIG. 5B schematically shows a forming process of light pulses in the light source according to the third embodiment of the present disclosure.

Referring to FIG. 5B, a difference between the third embodiment and the first embodiment is that, the master laser pulse is not directly inputted to the slave laser 32 as a seed light. Instead, the master laser pulse is inputted to the unbalanced interferometer 37 and is spilt into two pulse components by the unbalanced interferometer 37. The two pulse components are injected into the slave laser 32 via the port 1 and the port 2 of the optical transmission element 33. By modulating a relative time delay between the master laser and the slave laser, to allow the two pulse components of the master laser pulse to cover two successive slave laser pulses in time respectively (that is, the two pulse components of the master laser pulse are respectively arranged at the first (third) time position and the second (fourth) time position) during a system period, the slave laser 32 generates two successive slave laser pulses in the injection locking manner under the stimulation of the two pulse components of the master laser pulse serving as seed lights. The slave laser pulses are outputted from the port 3 of the optical transmission element 33, to serve as the output pulse of the light source.

Since the two pulse components of the master laser pulse, which serve as the seed lights, are originated from one master laser pulse after passing through the unbalanced interferometer 37, the two pulse components of the master laser pulse have the same wavelength feature and the fixed phase relation. Accordingly, there is a fixed phase relation between two slave laser pulses outputted from the slave laser 32 under the stimulation of the two seed lights.

An operating principle and an operating mode of the light source based on the X basis and the Z basis in this embodiment are similar to those described in the first embodiment in which the pulse components of the master laser pulse at different time positions serve as the seed lights, and a principle and a mode of performing time-bin encoding and phase encoding using the pulse from the light source are also similar to those described in the first embodiment. Thus, description is not repeated, and only differences between this embodiment and the first embodiment are described in detail herein.

In this embodiment, it is required to set an arm length difference of the unbalanced interferometer 37 such that a time difference between two successive pulse components outputted from the unbalanced interferometer 37 is equal to a time interval between the two successive third slave laser pulses outputted from the slave laser 32. Due to the unbalanced interferometer, it is unnecessary to set the width of the master laser pulse to be greater than or equal to a total width of the two successive slave laser pulses. In this case, it is only required to set the width of the master laser pulse to be greater than or equal to the width of one slave laser pulse, such that the demand for performance of the master laser 31 is significantly reduced.

Further, those skilled in the art should understand that, in the first embodiment, the two seed lights used to stimulate the slave laser to generate the two successive slave laser pulses are originated from the two pulse components of the master laser pulse at different time positions. Wavelengths of the two pulse components at different time positions may not be completely equal to each other due to a chirp phenomenon. However, in this embodiment, the two seed lights are generated through splitting one pulse by the unbalanced interferometer, thus the two seed lights have the same wavelength. That is, in consistency of the wavelengths of the two seed lights used to stimulate the slave laser to generate the two successive slave laser pulses, the light source in this embodiment is superior to that in the above embodiments.

In addition, the two successive slave laser pulses outputted from the light source under the X basis have an optimum wavelength consistency. Therefore, the interference contrast for X basis decoding can be improved, and the bit error rate for the X basis decoding can be reduced.

It should be noted that, in this embodiment, due to the unbalanced interferometer, the phase difference between the two successive third slave laser pulses outputted from the light source under the X basis may be affected by the change in phase of the unbalanced interferometer. However, in the light source in the first embodiment, the phase difference is constant.

Fourth Embodiment

Figure 6A:
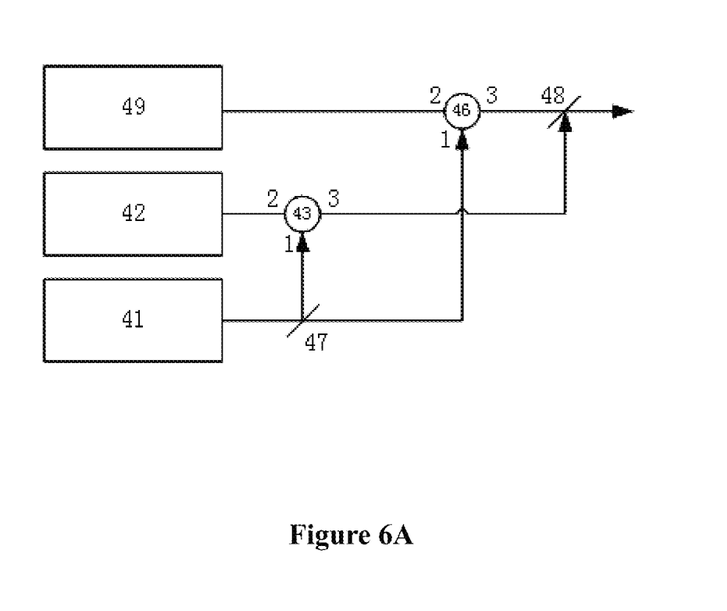
FIG. 6A schematically shows a light source and an encoding device according to a fourth embodiment of the present disclosure.

FIG. 6A shows a light source according to a fourth embodiment of the present disclosure. Referring to FIG. 6A, in this embodiment, the light source includes a master laser 41, a slave laser 42 and a slave laser 49. The master laser pulse is split into two pulse components by the first beam splitter 47. The two pulse components are respectively injected into the first slave laser 42 via the first optical transmission element 43 and the second slave laser 49 via the second optical transmission element 46, to serve as the seed lights. Two slave laser pulses outputted from the first slave laser 42 and the second slave laser 49 are respectively transmitted through the first optical transmission element 43 and the second optical transmission element 46, and are combined by a second beam splitter, to serve as an output pulse of the light source, to provide a signal light pulse for encoding.

Referring to FIG. 6A, in this embodiment, structures and configurations of the optical transmission elements 43 and 46, as well as the connection between the first master laser and the second master laser are similar to those described in the first embodiment, and description is not repeated herein.

Similarly, the optical transmission element may be a circulator or a beam splitter. Preferably, the circulator is used as the optical transmission element in this embodiment.

Figure 6B:
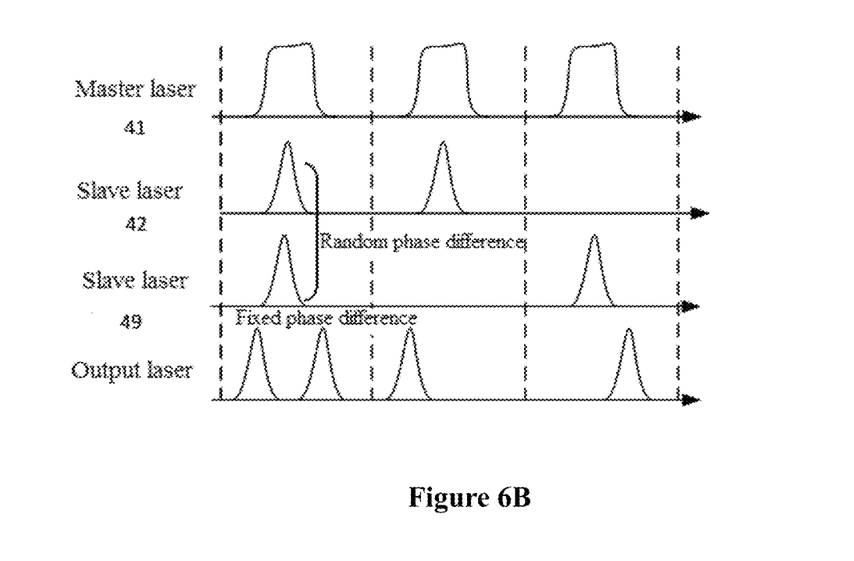
FIG. 6B schematically shows a forming process of light pulses in the light source according to the fourth embodiment of the present disclosure.

It may be understood more clearly from FIGS. 6A and 6B, a difference between the fourth embodiment and the first embodiment is that, two slave lasers are arranged, and the master laser pulse is not directly inputted to the slave laser as the seed light. Instead, the master laser pulse is inputted to the first beam splitter 47 and is spilt into two pulse components by the first beam splitter 47. The two pulse components are inputted to respective slave lasers via different light paths. By modulating the relative time delay between the master laser and the slave laser to allow one of the two pulse components of the master laser pulse to cover a slave laser pulse of the first slave laser 42 at the first (third) time position, and allow the other one of the two pulse components of the master laser pulse to cover a slave laser pulse of the second slave laser 49 at the second (fourth) time position, the two pulse components of the master laser pulse serve as seed lights to respectively stimulate the first slave laser 42 and the second slave laser 49 to generate two slave laser pulses at preset time positions in the injection locking manner. The slave laser pulse outputted from the first slave laser 42 and the slave laser pulse outputted from the second slave laser 49 are combined by the second beam splitter 48 and are outputted, to serve as an output pulse of the light source.

In a case of the X basis encoding, during a system period, the slave drive signal source outputs the third slave drive signal, such that the first slave laser 42 generates, under stimulation of a pulse component of the master laser pulse injected into the first slave laser 42, a third slave laser pulse at the third time position, and the second slave laser 49 generates, under stimulation of a pulse component of the master laser pulse injected into the second slave laser 49, a third slave laser pulse at the third time position. The two third slave laser pulses are combined by the second beam splitter and outputted, to provide two successive pulses with a preset time interval. During a system period, since the two seed lights respectively injected into the two slave lasers are formed by splitting the master laser pulse into two pulse components by the beam splitter, there is the same wavelength feature and a fixed phase relation between the two seed lights. Therefore, there is also a fixed phase relation between the two successive third slave laser pulses outputted from the light source.

In a case of the Z basis encoding, during the system period, the slave drive signal source randomly outputs one of the first slave drive signal and the second slave drive signal to drive the first slave laser or the second slave laser, such that the first slave laser or the second slave laser generates, under stimulation of the pulse component of the master laser pulse injected into the slave laser, a first slave laser pulse at the first time position or a second slave laser pulse at the second time position in the injection locking manner. The output time of the first slave laser pulse or the second slave laser pulse corresponds to the first time position or the second time position. The first slave laser pulse and the second slave laser pulse with different output time features may be directly used to represent different time-bin codes. For example, in a case that the light source outputs only the first slave laser pulse during a system period, the first slave laser pulse may be used to represent a case that lighting occurs at the first time position and extinction occurs at the second time position, that is, to represent a time-bin code 1. In a case that the light source outputs only the second slave laser pulse during a system period, the second slave laser pulse may be used to represent a case that extinction occurs at the first time position and lighting occurs at the second time position, that is, to represent a time-bin code 0; and vice versa.

In this embodiment, since the beam splitter and the two slave lasers are arranged, it is unnecessary to set that the width of the master laser pulse to be greater than or equal to a total width of the two successive slave laser pulses. Instead, it is only required to set the width of the master laser pulse to be greater than or equal to the width of a slave laser pulse, which also reduce the demand for performance of the master laser. Further, the slave laser in this embodiment may have the same operating frequency as the master laser.

Further, as described above, in the first embodiment, wavelengths of the two seed lights used to stimulate the slave laser to generate the two successive slave laser pulses may not be completely the same. However, in this embodiment, the two seed lights are generated by splitting one pulse by the beam splitter, thus the two seed lights have the same wavelength feature. That is, in the consistency of the wavelengths of the two seed lights used to stimulate the slave laser to generate the two successive slave laser pulses, the light source in this embodiment is superior to that in the first embodiment.

In addition, the two successive slave laser pulses outputted from the light source under the X basis have a good wavelength consistency, such that the interference contrast for the X basis decoding is improved, and the bit error rate for the X basis decoding under is reduced.

Further, since two slave lasers are arranged in this embodiment, a delay element 40 (for example, an electrically tunable time delayer) may be additionally arranged in the output light path of the two slave lasers, to flexibly modulate the time interval between the two light pulses in a time mode. Since different decoding devices may have different demands for time interval, the tenability of the time interval may allow the light source in this embodiment to be flexibly applicable to encoding devices corresponding to various decoding devices.

The concept of the present disclosure may be more fully understood in combination with the above exemplary embodiments. That is, a pulsed light source having a novel structure suitable for an application in which both time-bin encoding and phase encoding are performed, for example, a quantum communication system using the time-bin phase encoding manner, is formed based on the injection locking technique and the laser internal modulation technique. On one hand, the pulsed light resource may provide a time state (the Z basis) with a high and stable extinction ratio with the laser internal modulation technique. On the other hand, the pulsed light resource may provide two pulses with a fixed time relation and a fixed phase relation rather than providing a random pulse with the laser internal modulation technology, for the phase encoding (the X basis). In this way, a preconception that the laser internal modulation technique is not directly used for phase encoding (the X basis) due to that only pulses with a random phase relation are generated with the laser internal modulation technique is eliminated.

Those skilled in the art should understand that, the light source in this embodiment is suitable for the time-bin encoding and/or the phase encoding. In particular, the light source in this embodiment is suitable for a scheme in which both time-bin encoding and phase encoding are performed (for example, the time-bin phase encoding scheme), which includes, but is not limited to, encoding schemes based on a decoy state BB84 protocol, a reference-frame-independent quantum key distribution (RFIQKD) protocol and a loss-tolerant protocol. Further, advantages of the light source are more apparent in a case that the light source is applied in an MDIQKD system.

Encoding Device

In another aspect of the present disclosure, an encoding device for time-bin encoding and phase encoding is further provided. The encoding device includes the light source according to the present disclosure. The light source is configured to output two successive light pulses with a fixed time relation and a fixed phase relation under the X basis, and output one of two successive light pulses under the Z basis. Under the decoy state BB84 protocol and/or the RFIQKD protocol, the encoding device may further include a phase modulator configured to apply a modulation phase between the two successive light pulses under the X basis. Optionally, the encoding device may further include an intensity modulator configured to attenuate intensities of the two successive light pulses under the X basis, such that a sum of the intensities of the two successive light pulses under the X basis is equal to the intensity of one of two successive light pulses under the Z basis.

Compared with an encoding device according to the conventional technology, the encoding device in the present disclosure includes less optical elements and requires no additional feedback mechanism, such that the encoding device in the present disclosure has a simple structure. Further, the light pulse for encoding provided by the light source has a better wavelength consistency and a better phase stability, thus the encoding device in the present disclosure can achieve a higher key rate and stability.

The above description shows embodiments of the present disclosure, it should be noted that various alternations and modifications may be made by those skilled in the art without deviating from the technical principle of the present disclosure, and those alternations and modifications should fall within the protection scope of the present disclosure.

The invention claimed is:

1. A light source for performing both time-bin encoding and phase encoding, comprising:
a master laser configured to output, in response to a master drive signal from a master drive signal source, a master laser pulse during a system period, to form a seed light; and
a slave laser configured to output, under stimulation of the seed light and in response to a slave drive signal from a slave drive signal source, a slave laser pulse in an injection locking manner, to encode a signal light pulse, wherein
the slave drive signal comprises a first slave drive signal, a second slave drive signal and a third slave drive signal, and one of the first slave drive signal, the second slave drive signal and the third slave drive signal is randomly selected and outputted during the system period, to drive the slave laser, and wherein
during the system period, the slave laser is configured to:
output, in response to the first slave drive signal, only one first slave laser pulse, wherein the first slave laser pulse is generated under stimulation of a pulse component of the master laser pulse at a first time position;
output, in response to the second slave drive signal, only one second slave laser pulse during the system period, wherein the second slave laser pulse is generated under stimulation of a pulse component of the master laser pulse at a second time position; and
output, in response to the third slave drive signal, two successive third slave laser pulses during the system period, wherein the two third slave laser pulses are generated respectively under stimulation of a pulse component of the master laser pulse at a third time position and a pulse component of the master laser pulse at a fourth time position;
wherein the master laser is connected to the slave laser via an optical transmission element;
the master laser pulse is inputted to a first port of the optical transmission element and is outputted from a second port of the optical transmission element, and is injected into the slave laser after being outputted from the second port of the optical transmission element; and
the slave laser pulse is inputted to the second port of the optical transmission element and is outputted from a third port of the optical transmission element;
wherein the number of the master laser is one, and the number of the slave laser is one;
an unbalanced interferometer is arranged between the master laser and the optical transmission element; and
an arm length difference of the unbalanced interferometer is set to allow a time difference between two pulse components formed through splitting the master laser pulse by the unbalanced interferometer is equal to a time interval between the two third slave laser pulses:
wherein the first and second slave laser pulses are used for time-bin encoding; and,
the two successive third slave laser pulses are used for phase encoding.

2. The light source according to claim 1, further comprising a laser configured to provide another seed light for the master laser, to allow the master laser to generate the master laser pulse in the injection locking manner.

3. The light source according to claim 1, wherein an operating frequency of the master laser is equal to a system frequency; an operating frequency of the slave laser is at least twice the operating frequency of the master laser; and a width of the master laser pulse is greater than a width of the slave laser pulse.

4. The light source according to claim 3, wherein
a relative time delay between the slave laser and the master laser is set to allow the two pulse components formed through splitting the master laser pulse by the unbalanced interferometer, when being injected into the slave laser, to respectively cover the two successive third slave laser pulses in time during the system period, and wherein
the first time position is identical to the third time position and the second time position is identical to the fourth time position.

5. The light source according to claim 4, wherein the optical transmission element is a circulator or a beam splitter.

6. The light source according to claim 4, wherein an intensity of the first slave laser pulse is equal to an intensity of the second slave laser pulse, and the intensity of the first slave laser pulse is twice an intensity of the third slave laser pulse.

7. An encoding device for performing both time-bin encoding and phase encoding, comprising alight source for performing both time-bin encoding and phase encoding, wherein the light source comprises:
a master laser configured to output, in response to a master drive signal from a master drive signal source, a master laser pulse during a system period, to form a seed light; and
a slave laser configured to output, under stimulation of the seed light and in response to a slave drive signal from a slave drive signal source, a slave laser pulse in an injection locking manner, to encode a signal light pulse, wherein
the slave drive signal comprises a first slave drive signal, a second slave drive signal and a third slave drive signal, and one of the first slave drive signal, the second slave drive signal and the third slave drive signal is randomly selected and outputted during the system period, to drive the slave laser, and wherein
during the system period, the slave laser is configured to:
output, in response to the first slave drive signal, only one first slave laser pulse, wherein the first slave laser pulse is generated under stimulation of a pulse component of the master laser pulse at a first time position;
output, in response to the second slave drive signal, only one second slave laser pulse during the system period, wherein the second slave laser pulse is generated under stimulation of a pulse component of the master laser pulse at a second time position; and
output, in response to the third slave drive signal, two successive third slave laser pulses during the system period, wherein the two third slave laser pulses are generated respectively under stimulation of a pulse component of the master laser pulse at a third time position and a pulse component of the master laser pulse at a fourth time position;
wherein the master laser is connected to the slave laser via an optical transmission element;
the master laser pulse is inputted to a first port of the optical transmission element and is outputted from a second port of the optical transmission element, and is injected into the slave laser after being outputted from the second port of the optical transmission element; and
the slave laser pulse is inputted to the second port of the optical transmission element and is outputted from a third port of the optical transmission element:
wherein the number of the master laser is one, and the number of the slave laser is one:
an unbalanced interferometer is arranged between the master laser and the optical transmission element; and
an arm length difference of the unbalanced interferometer is set to allow a time difference between two pulse components formed through splitting the master laser pulse by the unbalanced interferometer is equal to a time interval between the two third slave laser pulses:
wherein the first and second slave laser pulses are used for time-bin encoding; and,
the two successive third slave laser pulses are used for phase encoding.

8. The encoding device according to claim 7, further comprising at least one of:
a phase modulator configured to modulate a phase difference between the two successive third slave laser pulses; and
an intensity modulator configured to modulate a relative intensity among the first slave laser pulse, the second slave laser pulse and the third slave laser pulse.

\* \* \* \* \*